March 28, 1961  G. CHRISTIN  2,976,592
CLIP FOR BINDING TOGETHER ELEMENTS OF ELONGATED SHAPE
Filed March 11, 1957

United States Patent Office 2,976,592
Patented Mar. 28, 1961

2,976,592

CLIP FOR BINDING TOGETHER ELEMENTS OF ELONGATED SHAPE

Georges Christin, Boulogne-sur-Seine, France, assignor to Etablissements Bertrand Faure, Puteaux (Seine), France, a society of France Filed Mar. 11, 1957, Ser. No. 645,341

Claims priority, application France Mar. 15, 1956

3 Claims. (Cl. 24—129)

The present invention relates to clips for binding together at least two elements of elongated shape by wrapping of said clips around said elements juxtaposed to each other. The term "elements" applies to cables, strips, rods, tubes, and so on. My invention is especially, but not exclusively, concerned with clips for assembling together metallic wires, such as are used in the manufacture of spring cushions, seats, mattresses, and so on.

The object of my invention is to provide a clip of this kind which is better adapted to meet the requirements of practice than those known at the present time.

According to my invention, the clip consists in a plate of a thin deformable material bent to form two branches making at most a small angle with each other, the inner and outer surfaces of said branches being provided with projections and recesses arranged to cooperate with corresponding recesses and projections respectively of a similar clip engaged on the first one, with the lines of bending of said clips parallel to each other.

A preferred embodiment of my invention will be hereinafter described with reference to the accompanying drawings, given merely by way of example and in which.

For the sake of clarity, I will hereinafter designate by the term "wires" the elongated elements to be assembled together by means of clips.

It is known to utilize clips constituted by small metal plates wrapped around the wires to be assembled together, the opposed ends of said plates being of complementary shapes so that once the clip has been wrapped around the wires, said wires are more securely held together by the clip.

However, such clips could not be mounted upon one another so as to constitute a kind of chain the elements of which are easily detachable from said chain, in order to use after one another a succession of such clips.

According to my invention, the clips which are bent into U or V shape are provided with recesses and projections arranged to cooperate with corresponding projections and recesses, respectively, of a similar clip engaged on the first one, with the lines of bending of said clips parallel to each other.

The metal of which the clips are made is chosen such that it can be bent to give the clips the desired shape and also that, once it has been bent, it tends to keep the shape it has been given.

Advantageously, the above mentioned recesses and projections are obtained by punching the metal plate so that the hollows formed on one face of the clip correspond to projections formed on the other face.

Figure 6:
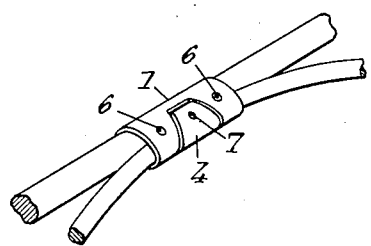
Fig. 6 is a perspective view showing how a clip according to my invention is wrapped around two wires to be assembled together.

In order to wrap such clips on two or more wires to be assembled together, I advantageously make use of a tool which pushes each clip in U-shaped grooves so as to compel the ends of the clip to bend into the shape of said grooves and to be wrapped around the wires to be assembled together, as shown by Fig. 6. Of course, I may perform this operation manually by means of suitable pliers.

Figure 1:
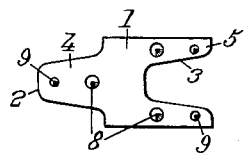
Fig. 1 is a plan view of the plate which is to form the clip, before said plate has been bent.
Figure 2:
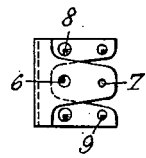
Figs. 2 and 3 show, respectively in plan view and in side view, a clip made according to my invention.
Figure 3:
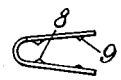

Figs. 1 to 3 show a preferred embodiment of a clip according to my invention.

As above stated, the opposed ends 2 and 3 of the metal plate have complementary shapes so that they can fit in one another when the plate is wrapped around the wires to be assembled together.

For instance, one of the ends 2 forms a kind of tongue 4 of the same shape as a notch provided at the other end 3 between two lateral extensions 5.

Tongue 4 and extensions 5 are provided with recesses 6, 7 and corresponding projections 8, 9, the projections being all formed on the same side of the surface of the clip when said clip is developed, this side corresponding to the inner face of the clip once it has been bent, as shown by Fig. 3.

Advantageously, the recesses 6 (and therefore the corresponding projections 8) located in the middle portion of the clip (that is to say close to the line along which the plate forming said clip is bent) are larger than the recesses 7 (corresponding to projections 9) located near the ends 2 and 3 of the plate. But every projection which is to cooperate with a recess is substantially smaller than said recess, which permits a slight angular displacement of one clip with respect to the next one.

Figure 4:
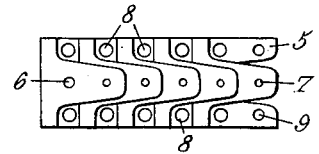
Figs. 4 and 5 are respectively a plan view and a side view of a series of clips engaged on one another so as to form a kind of chain.
Figure 5:
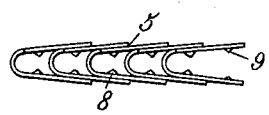

Figs. 4 and 5 show a plurality of clips 1 overlapping one another and engaging one another so as to form a kind of chain, and these figures show that the small projections 9 are engaged in the large recesses 6, whereas the big projections 8 and the small recesses 7 are not used for connecting the clips together.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A clip for binding together at least two elements of elongated shape by wrapping of said clip around said elements juxtaposed to each other, said clip consisting of a plate of a thin deformable material bent along a line of bending to form two branches making a small angle with each other so that said clip, seen from a direction parallel to said line of bending has the form of a V with a rounded apex, said branches being punched at points so as to form, at each of these points, a circular boss on one face of the branch and a circular recess in the other face, said points being distributed by pairs each disposed along a line at right angles to said line of bending, one of the points of each pair being at a distance from said line of bending smaller than the distance between the two points of each pair and the bosses at the two points of each pair being on the same face of the branch on which they are located, whereby two such clips nested in each other can be held together by mutual engagement of the punched points of two corresponding pairs of said respective clips located at different distances from their corresponding lines of bending, the dimensions of the boss at the point of a pair located nearer to said line of bending than the other being larger than those of the recess at said other point of said pair.

2. A clip according to claim 1 in which said bosses are located on the inner faces of said branches.

3. A clip according to claim 1 in which the opposed ends of said plate have edges of complementary shapes.

References Cited in the file of this patent

UNITED STATES PATENTS

| | | |
|---|---|---|
| 735,006 | Watkins | July 28, 1903 |
| 1,914,726 | Mercer | June 20, 1933 |
| 2,062,098 | MacChesney | Nov. 24, 1936 |
| 2,657,890 | Atkins | Nov. 3, 1953 |
| 2,691,198 | Flood | Oct. 12, 1954 |
| 2,746,601 | Rebichon | May 22, 1956 |

FOREIGN PATENTS

| | | |
|---|---|---|
| 653,362 | Great Britain | May 16, 1951 |